(12) United States Patent
Chou

(10) Patent No.: US 6,359,764 B1
(45) Date of Patent: Mar. 19, 2002

(54) PORTABLE COMMUNICATION ADAPTER HAVING A POWER CABLE AND A SIGNAL CABLE

(76) Inventor: Jonie Chou, 9F-4, No. 232, Chung Ho Road, Chung Ho City, Taipei Hsien (TW)

( * ) Notice: Subject to any disclaimer, the term of this patent is extended or adjusted under 35 U.S.C. 154(b) by 0 days.

(21) Appl. No.: 09/495,314

(22) Filed: Feb. 1, 2000

(51) Int. Cl.$^7$ ............................ H02H 7/08; H01R 13/72
(52) U.S. Cl. ........................................ 361/93.1; 439/501
(58) Field of Search .................... 361/93.1; 439/501, 439/373, 652

(56) References Cited

U.S. PATENT DOCUMENTS

| | | | | |
|---|---|---|---|---|
| 4,052,019 A | * | 10/1977 | Dickson, Jr. | 242/486.7 |
| 5,700,158 A | * | 12/1997 | Neiser et al. | 439/501 |
| 5,733,141 A | * | 3/1998 | Penrod | 439/501 |

\* cited by examiner

Primary Examiner—Peter S. Wong
Assistant Examiner—Pia Tibbits
(74) Attorney, Agent, or Firm—Troxell Law Office PLLC

(57) ABSTRACT

A communication adapter includes a top cover shell having a power input hole and a power output hole and an elongated signal output hole, a power cable having a power input connector disposed at one end and fixedly mounted in the power input hole on the top cover shell for connection to utility power source and a power output connector disposed at an opposite end and extended out of the power output hole on the top cover shell for power output to an external electronic apparatus, a bottom cover shell covered on the top cover shell, a rotary cap rotatably covered on the bottom cover shell, the rotary cap having a tubular upright center shaft inserted through a center hole on the bottom cover shell, and a signal cable wound round the tubular upright shaft, the signal cable having a signal input connector disposed at one end and extended out of a cable hole on the bottom cover shell, and a plurality of signal output connectors disposed in parallel at an opposite end and respectively fixedly fastened to the signal output hole on the top cover shell.

12 Claims, 5 Drawing Sheets

US 6,359,764 B1

PORTABLE COMMUNICATION ADAPTER HAVING A POWER CABLE AND A SIGNAL CABLE

BACKGROUND OF THE INVENTION

1. Field of the Invention

The present invention relates to a communication adapter, which comprises a power cable having a power input connector and a power output connector at two opposite ends, a signal cable having a signal input connector at one end and a plurality of signal output connectors at an opposite end, and a rotary cap rotated to take up/let off the signal cable.

2. Description of Related Art

Following fast development of information industry, a variety of advanced communication apparatus have been developed. People for communication commonly use telephones and fax machines. Nowadays, people tend to use the Internet to send E-mail. Through the Internet, we can browse/download data from a remote provider. For communication through the Internet, a computer shall be used. Connecting a communication apparatus to the Internet can be down through a wired or wireless communication network. However, it is quite expensive to communicate a communication apparatus with a wireless communication network. In a wired communication network, the locations of the output terminals are fixed, and may not be conveniently accessible.

When a mobile communication apparatus, for example, a mobile computer or fax machine is used, a power cable and a signal cable may be needed to connect the mobile computer or fax machine to utility power source and a particular output terminal of the communication network. In order to fit different electric codes in different countries, one who frequently travels between different countries shall have to prepare different power cables for use with the mobile computer.

SUMMARY OF THE INVENTION

The present invention has been accomplished under the circumstances in view. It is the main object of the present invention to provide a communication adapter, which connects a communication apparatus to a communication network, and provides the necessary working power supply to the communication apparatus.

According to the present invention, the communication adapter comprises a top cover shell, the top cover shell comprising a power input hole and a power output hole disposed at two opposite sides, and an elongated signal output hole, a power cable, the power cable comprising a power input connector fixedly mounted in the power input hole on the top cover shell for connection to utility power source, a power output connector disposed outside the top cover shell for power output to an external electronic apparatus, and a cable connected between the power input connector and the power output connector, a bottom cover shell covered on the top cover shell at a bottom side, the bottom cover shell comprising a center hole, and a cable hole, a rotary cap covered on the bottom cover shell, the rotary cap comprising a tubular upright center shaft inserted into the center hole on the bottom cover shell, the tubular upright center shaft having a top notch, and coupling means coupled to the center hole on the bottom cover shell for enabling the rotary cap to be rotated relative to the bottom cover shell, and a signal cable, the signal cable comprising a signal line wound round the tubular upright shaft of the rotary cap inside the bottom cover shell, the signal line having a first end extended out of the top notch on the tubular upright shaft and the cable hole on the bottom cover shell, and a second end, a signal input connector connected to the first end of the signal line and disposed outside the bottom cover shell, and a plurality of signal output connectors connected in parallel to the second end of the signal line and fixedly mounted in the signal output hole on the top cover shell.

BRIEF DESCRIPTION OF THE DRAWINGS

The present invention can be more fully understood by referring to the following description and accompanying drawing, in which.

DEDETAILED DESCRIPTION OF THE PREFERRED EMBODIMENT

Figure 1:
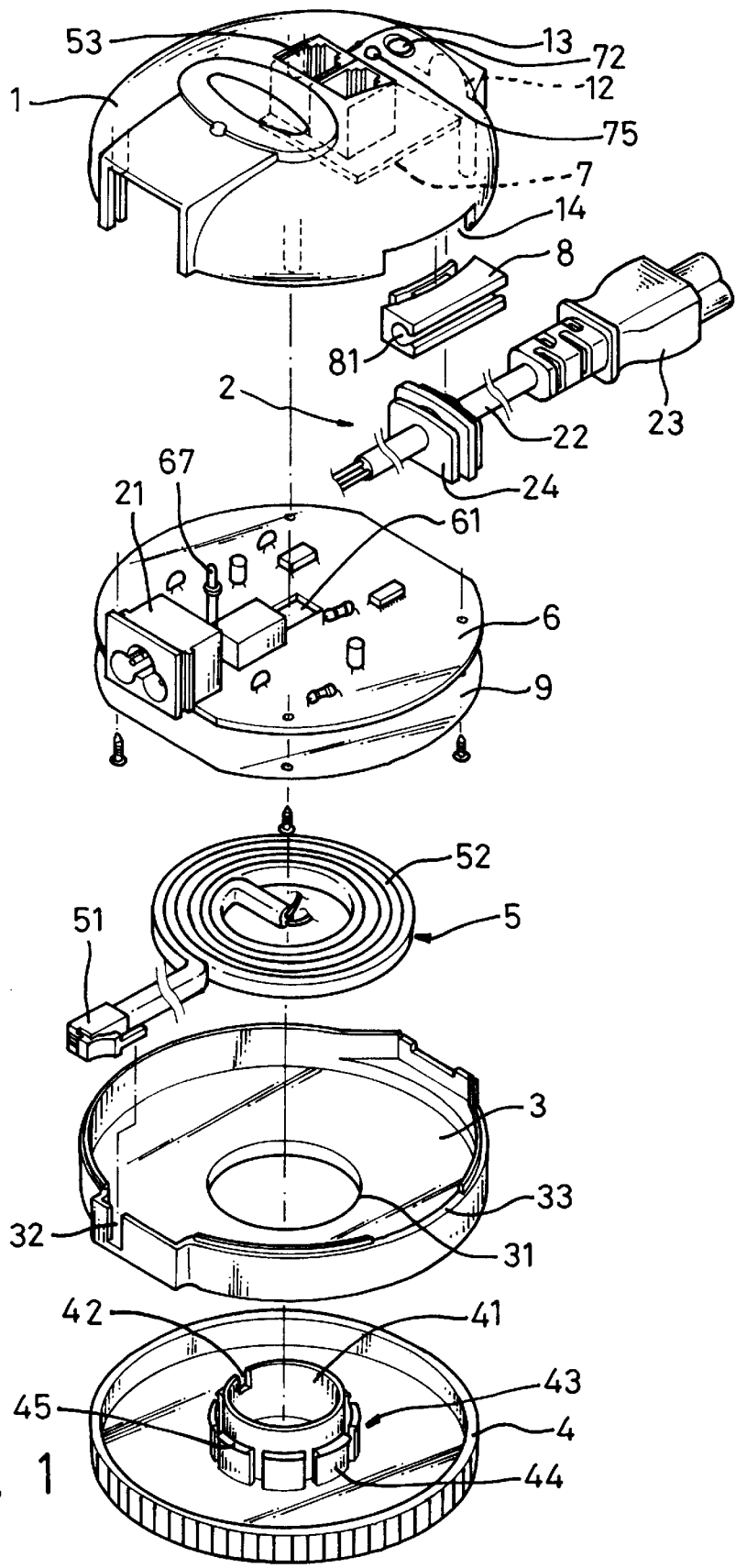
FIG. 1 is an exploded view of a communication adapter according to the present invention.

Referring to FIGS. from 1 through 3, a communication adapter in accordance with the present invention is generally comprised of a top cover shell 1, a power cable 2, a bottom cover shell 3, a rotary cap 4, and a signal cable 5.

The top cover shell 1 comprises a power input hole 11 and a power output hole 12 disposed at two opposite sides for the positioning of the power cable 2, an elongated signal output hole 13 for receiving module jacks 53 of the signal cable 5, and a side hole 14 for holding a cable holder 8. The cable holder 8 has a cable groove 81 for the positioning of a cable.

The power cable 2 comprises a power input connector 21 fixedly mounted in the power input hole 11 on the top cover shell 1 for connection to utility power source, a power output connector 23 disposed outside the top cover shell 1 for power output to an external electronic apparatus, for example, a mobile computer or fax machine, a cable 22 connected between the power input connector 21 and the power output connector 23, and a stopper 24 fixedly mounted around the cable 22 and fastened to the power output hole 12 on the top cover shell 1.

Figure 4:
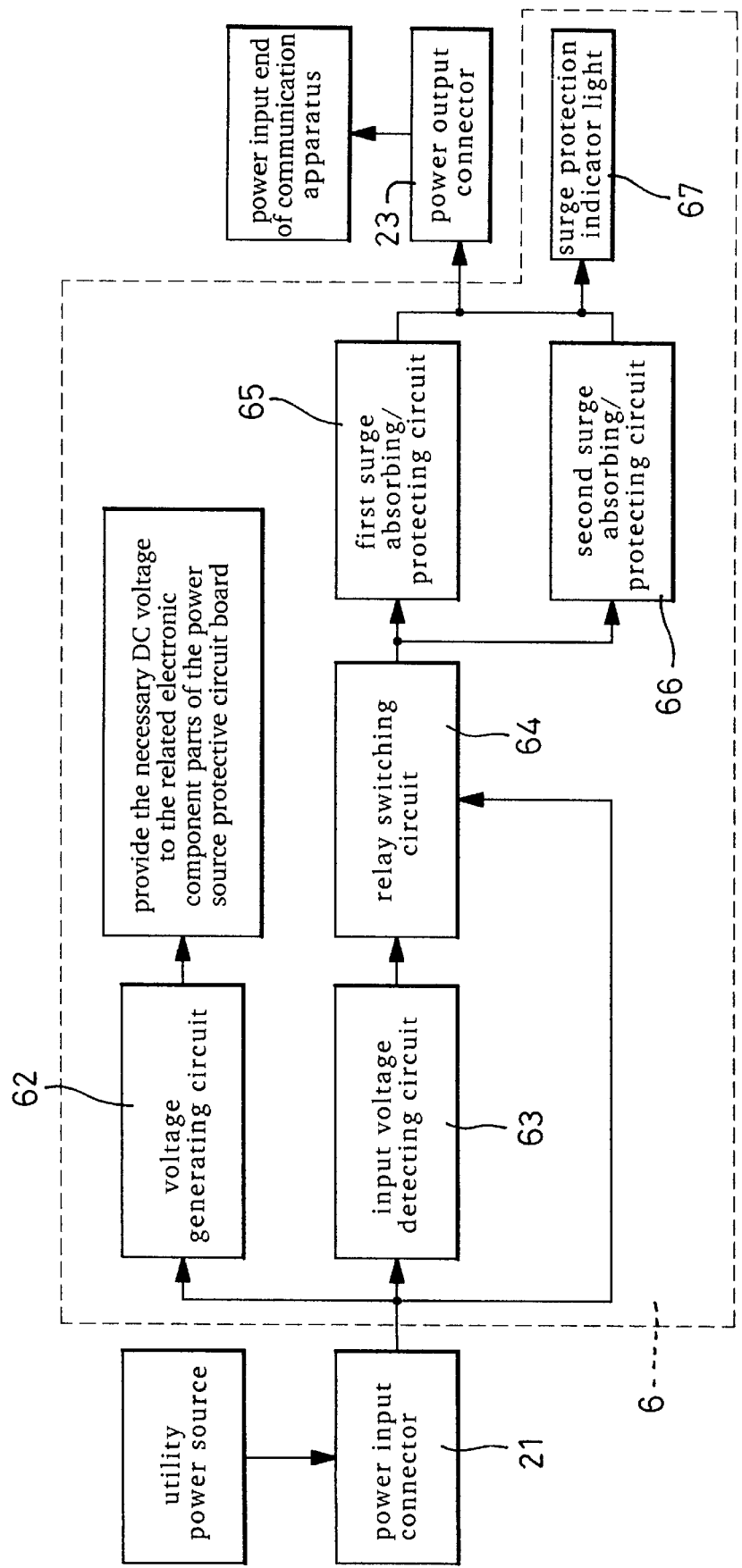
FIG. 4 is a circuit block diagram of the power source protective circuit according to the present invention.

Referring to FIG. 4 and FIGS. 1 and 2 again, in order to provide the power cable 2 with better voltage selection and system protection functions, a power source protective circuit board 6 is installed in between the power input connector 21 and the power output connector 23 inside the open bottom side of the top cover shell 1. The power source protective circuit board 6 comprises a slot 61 for the passing of the signal line 52 of the signal cable 5. The power source protective circuit board 6 receives utility power source from the power input connector 21. Upon receipt of utility power source by the power source protective circuit board 6, a part of received utility power source is transmitted to a voltage generating circuit 62, causing it to provide the necessary DC voltage to the related electronic component parts of the power source protective circuit board 6, a part of received utility power source is transmitted to an input voltage detecting circuit 63, which detects the voltage of input power, and the major part of received utility power source is transmitted to a relay switching circuit 64, which controls the transmission of utility power source to a first surge absorbing/protecting circuit 65 or a second surge absorbing/protecting circuit 66. For example, 110V is controlled to pass to the first surge absorbing/protecting circuit 65, and 220V is controlled to pass to the second surge absorbing/protecting circuit 66. If the system is normal, the surge protection indicator light 67, which is exposed outside the top cover shell 1, is turned on. Stable output voltage is than transmitted from the first surge absorbing/protecting circuit 65 or the second surge absorbing/protecting circuit 66 to the power output connector 23 for providing to the power input end of an external communication apparatus. The installation of the power source protective circuit board 6 prevents the damage of a surge, for example, lightning surge.

The bottom cover shell 3 is covered on the bottom open side of the top cover shell 1 to hold the power source protective circuit board 6 and the signal cable 5 on the inside. The bottom cover shell 3 comprises a center hole 31, a cable hole 32 matching with the power input hole 11 on the top cover shell 1 to hold the signal line 52 of the signal cable 5, and a side hole 33 matching with the side hole 14 on the top cover shell 1 to hold the cable holder 8.

The rotary cap 4 is covered on the outside of the bottom cover shell 3, comprising a tubular upright center shaft 41 for the winding of the signal line 52 of the signal cable 5, a notch 42 on the top end of the tubular upright shaft 41 for the positioning of the signal line 52, and coupling means 43 for securing the rotary cap 4 to the center hole 31 on the bottom cover shell 3, enabling the rotary cap 4 to be rotated relative to the bottom cover shell 3 to take up or let off the signal cable 5. The coupling means 43 is comprised of a plurality of springy coupling plates 44 equiangularly spaced around the tubular upright shaft 41 and inserted into the center hole 31 on the bottom cover shell 3. The springy coupling plates 44 each have a hooked top end 45 stopped inside the inside wall of the bottom cover shell 3 around the center hole 31.

The signal cable 5 comprises a signal line 52 wound round the tubular upright shaft 41 and disposed inside the bottom cover shell 3, a signal output connector, for example, a module plug 51 connected to one end of the signal line 52 and extended through the notch 42 on the top end of the tubular upright shaft 41 and the cable hole 32 to the outside of the bottom cover shell 3, and a plurality of signal output connectors, for example, module jacks 53 connected in parallel to the opposite end of the signal line 52 and respectively mounted in the elongated signal output hole 13.

Figure 2:
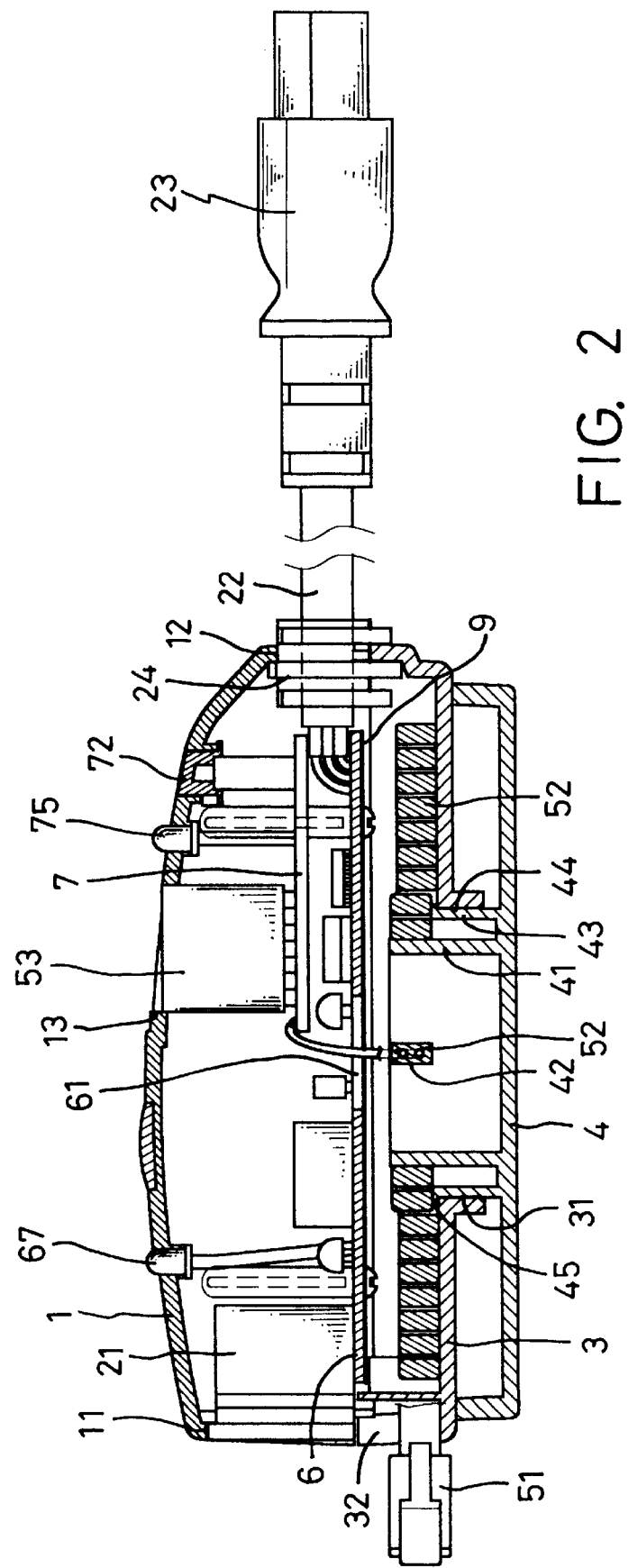
FIG. 2 is a sectional assembly view of the communication adapter according to the present invention.
Figure 5:
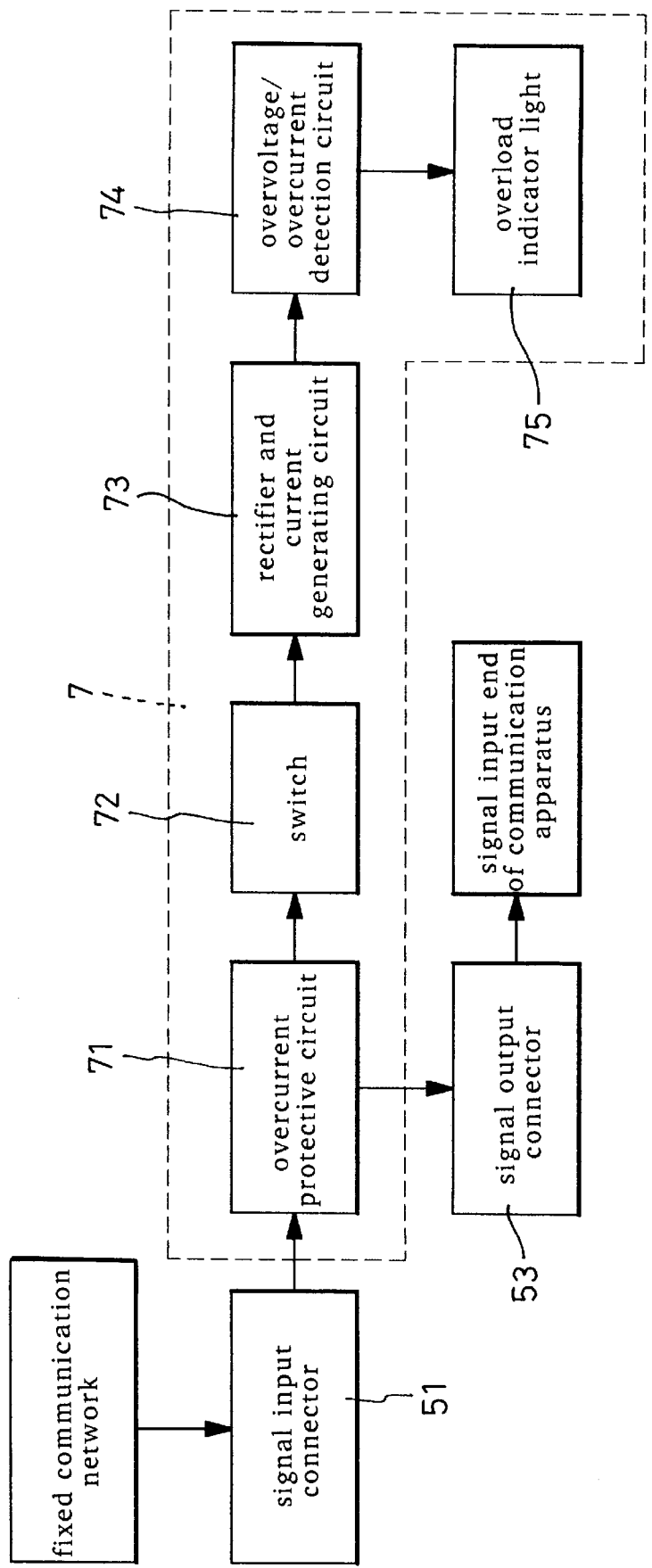
FIG. 5 is a circuit block diagram of the signal protective circuit according to the present invention.

Referring to FIG. 5 and FIGS. 1 and 2, in order to protect the signal cable 5, a signal protective circuit board 7 is fixedly mounted in the top cover shell 1 and electrically connected in between the module plug 51 and the module jacks 53. When the module plug 51 receives a signal, the signal passes to the module jacks 53 via an overcurrent protection circuit 71. The signal protective circuit board 7 further comprises a switch 72, a rectifier and current generating circuit 73, an overvoltage/overcurrent detection circuit 74, and an overload indicator light 75. The switch 72 is exposed to the outside of the top cover shell 1. When the user presses on the switch 72, electric current is allowed to pass from the overcurrent protection circuit 71 through the switch 72 to the rectifier and current generating circuit 73 and then the overvoltage/overcurrent detection circuit 74, causing the overvoltage/overcurrent detection circuit 74 to turn on the overload indicator light 75 when an overload occurs, or to turn off the overload indicator light 75 when the signal is normal. This design detects and protects the signal from the linked communication network, preventing damage to the communication network due to an overload.

Further, an electrically insulative partition board 9 is installed in the cover shells 1 and 3 between the power source protective circuit board 6 and the signal cable 5.

Figure 3:
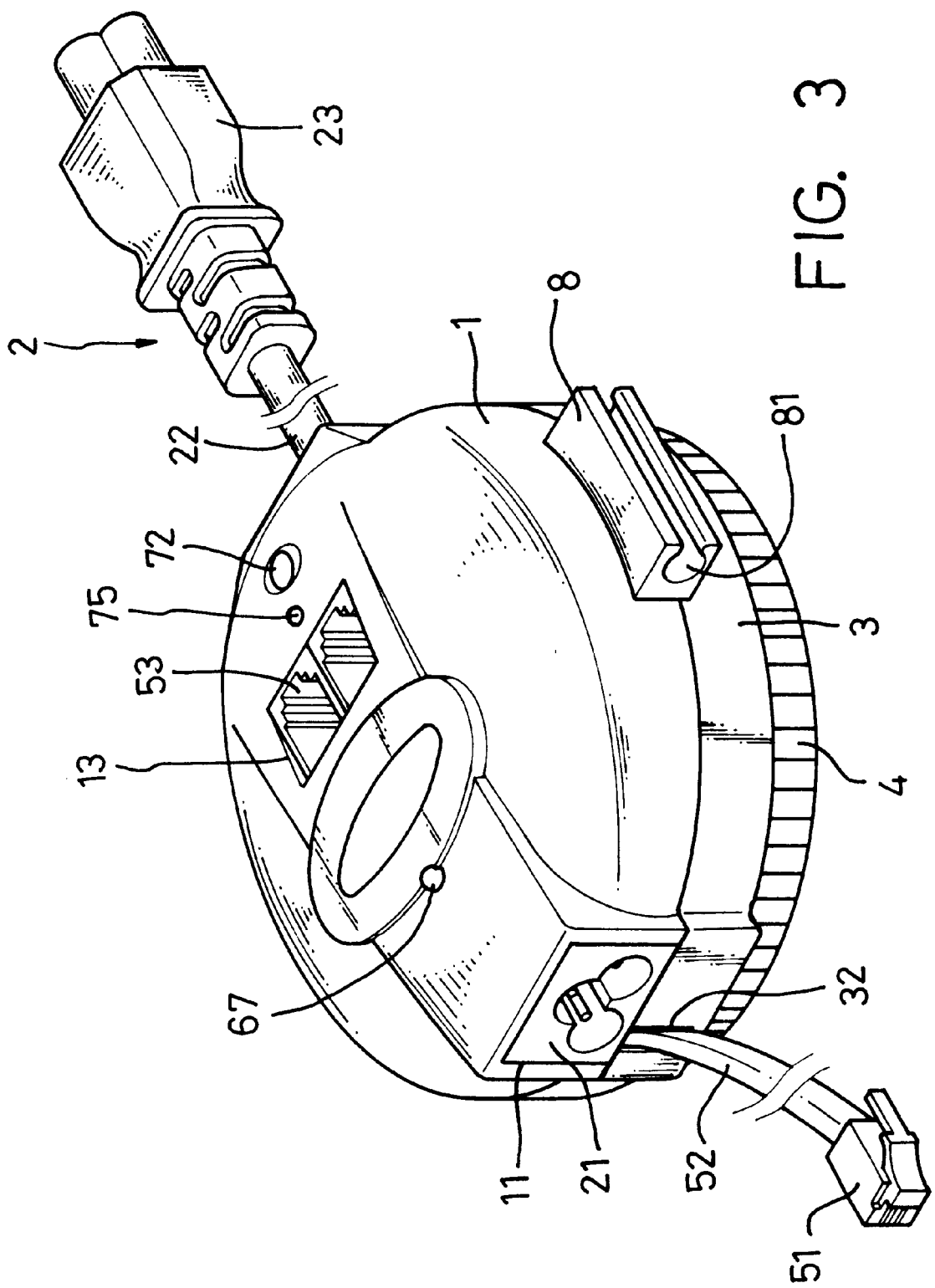
FIG. 3 is a perspective assembly view of the communication adapter according to the present invention.

Referring to FIGS. 2 and 3 again, when in use, the module plug 51 is pulled outwards and connected to one terminal of a communication network. When pulling the module plug 51 outwards, the rotary cap 4 is rotated to let off the signal line 52. After having been connected to the communication network, the electric signal adapter is placed on the work platform, the power input connector 21 is connected to utility power source, and the power input end and signal input end of the mobile computer can then be connected to the power output connector 23 and one module jack 53 for transmitting/receiving E-mail or fax message, or entering the Internet.

Auto-winding means and related control switch may be installed in the rotary cap 4, and controlled to take up/let off the signal line 52 of the signal cable 5 automatically.

When traveling or going outdoors for business, the user can connect a communication apparatus to a remote communication network by means of the communication adapter for communication. The power source protective circuit board automatically switches between for example, 110V and 220V, enabling the fit surge absorbing/protecting circuit to be selected for output of power source. The signal protective circuit board controls the signal from the communication network, preventing damage to the communication apparatus. The signal protective circuit board also monitors the signal from the communication network, and gives a visual indication when the signal is abnormal.

While only one embodiment of the present invention has been shown and described, it will be understood that various modifications and changes could be made thereunto without departing from the spirit and scope of the invention disclosed. For example, the signal input connector 51 and the signal output connectors 53 of the signal cable 5 can be telephone plug and telephone jacks, or male coaxial cable connector and female coaxial cable connectors.

Although exemplary embodiment of the invention has been described with reference to particular structures, it is to be understood that various modifications can be made thereto without departing form the spirit and scope of the invention. Accordingly, the invention is not limited by the above description but only by the attached claims.

What the invention claimed is:

1. A portable adapter having a power cable and a signal cable, and comprising:
   a) a first cover shell having a power input hole and a power output hole;
   b) a power input connector located in the power input hole;
   c) a power cable extending exteriorly of the first cover shell and having a distal end with a power connector thereon;
   d) a power source protective circuit connecting the power input connector and the power cable, the power source protective circuit including first and second surge absorbing/protecting circuits configured to pass two different voltages;
   e) a second cover shell connected to the first cover shell, the second cover shell having a cable hole;
   f) a signal cable in the second cover shell having an end with a module plug extending exteriorly of the second cover shell;

g) a rotary cap rotatably mounted on the second cover shell and attached to the signal cable whereby the signal cable is extended from and retracted into the second cover shell;

h) at least one module jack mounted on one of the first and second cover shells; and, i) a signal protective circuit connecting the at least one module jack and the signal cable, the signal protective circuit including an overcurrent protective circuit.

2. The portable adapter of claim 1 further comprising a plurality of module jacks mounted on the first cover shell.

3. The portable adapter of claim 1 further comprising:

a) a center hole through the second cover shell;

b) a tubular shaft extending from the rotary cap through the center hole, the signal cable being coiled around the tubular shaft; and, c) a plurality of spring coupling plates extending from the rotary cap and engaged with a periphery of the center hole to rotatably attach the rotary cap to the second cover sheet.

4. The portable adapter of claim 1 further comprising a cable holder on an exterior of the first cover shell, the cable holder having a cable groove therein.

5. The portable adapter of claim 1 wherein the power source protective circuit further comprises:

a) an input voltage detecting circuit connected to the power input connector; and, b) a relay switching circuit connected between the input voltage detecting circuit, and the first and second surge absorbing/protecting circuits.

6. The portable adapter of claim 5 further comprising a surge protection indicator light mounted on the first cover shell and connected to the power source protective circuit.

7. The portable adapter of claim 1 wherein the signal protective circuit further comprises:

a) a rectifier and current generating circuit;

b) a switch connected between the overcurrent protective circuit, and the rectifier and current generating circuit;

c) an overvoltage/overcurrent detection circuit connected to the rectifier and current generating circuit; and, d) an overload indicator light connected to the overvoltage/overcurrent detection circuit.

8. The portable adapter of claim 7 wherein the switch and overload indicator light are mounted on the first cover shell.

9. The portable adapter of claim 1 wherein the power source protective circuit is a circuit board.

10. The portable adapter of claim 7 wherein the signal protective circuit is a circuit board mounted in the first cover shell.

11. The portable adapter of claim 1 further comprising a stopper fixed to the power cable and mounted in the power output hole.

12. The portable adapter of claim 1 further comprising an electrically insulative partition located in the first and second cover shells between the power cable and signal cable.

* * * * *